E. R. DRAVER.
FEED REGULATOR.
APPLICATION FILED JULY 25, 1918.

1,369,968.

Patented Mar. 1, 1921.
2 SHEETS—SHEET 1.

Witnesses.
A. H. Opsahl
H. W. Kilson

Inventor.
Emil R. Draver
by his Attorneys
Williamson Merchant

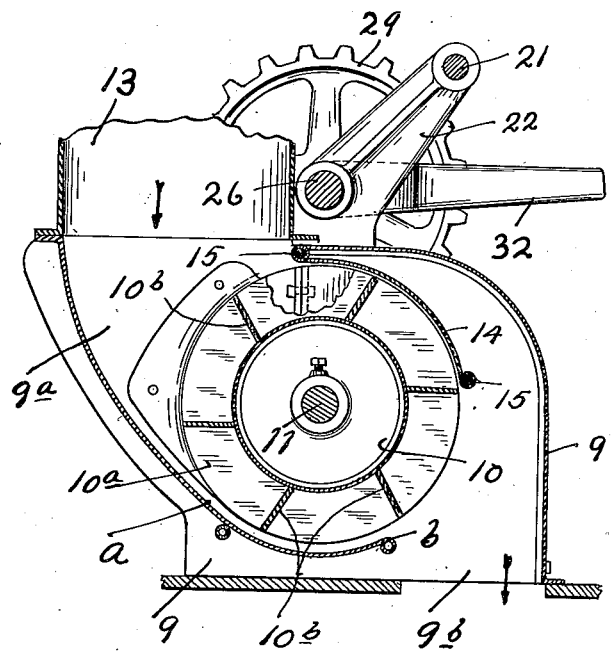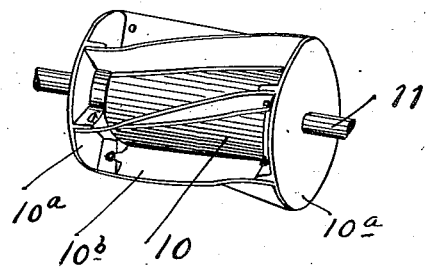

UNITED STATES PATENT OFFICE.

EMIL R. DRAVER, OF RICHMOND, INDIANA.

FEED-REGULATOR.

1,369,968.   Specification of Letters Patent.   Patented Mar. 1, 1921.

Original application filed December 16, 1916, Serial No. 137,431. Divided and this application filed July 25, 1918. Serial No. 246,694.

*To all whom it may concern:*

Be it known that I, EMIL R. DRAVER, a citizen of the United States, residing at Richmond, in the county of Wayne and State of Indiana, have invented certain new and useful Improvements in Feed-Regulators; and I do hereby declare the following to be a full, clear, and exact description of the invention, such as will enable others skilled in the art to which it appertains to make and use the same.

This invention relates to feed devices for use in feeding granular or finely divided materials, or even heavy fluids in definite predetermined quantities, variable at will; and to such ends, generally stated, the invention consists of the novel devices and combinations of devices hereinafter described and defined in the claim.

The present application is filed as a division of my application S. N. 137,431, filed December 16, 1916, entitled "Feed regulator" and is directed to one of the specimens disclosed in said earlier application.

In the accompanying drawings which illustrate the invention, like characters indicate like parts throughout the several views.

Referring to the drawings:

Fig. 2 is a vertical section taken on the line 2—2 of Fig. 1, some parts being broken away;

Fig. 4 is a perspective view of a slightly modified form of the drum.

The material is fed through a casing 9 which, for some purposes and as shown, is preferably made of sheet metal. Mounted to rotate within the casing 9 is a feed drum 10, the shaft 11 of which is journaled in and projected through suitable bearings on the sides of the casing, and at one end, is provided with a large ratchet wheel 12.

Figure 3:
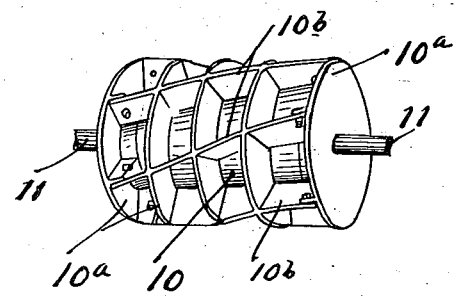
Fig. 3 is a perspective view of the feeder drum.

The feed drum 10 is provided with peripheral pockets $10^a$ formed preferably by providing the heads of the drum with outwardly projecting perimeters and connecting the same by oblique or spirally disposed flanges or partition blades $10^b$ and sub-partition blades $10^c$, as best shown in Fig. 3.

The feed drum is arranged to be rotated preferably in the direction of the arrow marked on Fig. 2, and the partition ribs $10^b$, instead of extending in cross section radially from the axis of the drum, are given a downward pitch to facilitate discharge of the material.

The material or stock to be fed is delivered to the casing 9 through a supply pipe 13 which opens into an extended hopperlike portion $9^a$ of the casing at one side of a vertical line drawn through the axis of the feed drum; and here it is important to note that the said casing 9 is provided with a discharge opening $9^b$ that is located on the opposite side of said vertical line. Otherwise stated, the inlet and outlet passages of the casing are nearly or entirely at opposite sides of a vertical line intersecting the axis of the drum. This arrangement is important.

In its upper portion, the casing 9 is provided with a shield or segmental retaining surface 14 preferably separately made from sheet metal having its lower edges bent around the transverse supporting rods 15, the ends of which are supported on the sides of the casing.

The concave surface of the shield 14 quite closely follows the line of travel of the extreme outer portions of the perimeters of the heads of the feed drum and the partition flanges $10^b$ and $10^c$, but the exact spacing will vary in machines designed for feeding different materials. In circumferential extent, the shield 14 is somewhat greater than the circumferential distance between the partition flanges $10^b$ so that there will be, at no time, a free unobstructed passage over the top of the feed drum.

The lower wall of the casing is preferably formed with a segmental portion extending downward from the point $a$ to a point $b$, Fig. 2. This portion $a$—$b$ is also in circumferential extent greater than the circumferential distance between the partition flanges $10^b$, and the space between the same and the outer edges of the partition flanges of the drum will also vary in machines designed to feed different material. Obviously, for feeding coarse stock or material, the spacing need not be close.

In a feed device of this kind, it is of the utmost importance that a variable speed driving mechanism be provided so as to vary the rate of feed. For this purpose, I have shown and preferably, but not necessarily, employ a variable speed feed mechanism disclosed and claimed in my prior Patent No. 1,215,506, granted of date, February 13, 1917, entitled "Variable speed mechanism." The parts of this variable speed mechanism may, therefore, be briefly described as follows:

For direct coöperation with the ratchet wheel 12, which constitutes a part of the said variable speed mechanism and which, it will be remembered, is secured on the feed drum shaft 11, there is a pair of reversely acting levers 16 pivoted on said shaft 11 and provided with reversely acting ratchet dogs or pawls 17. The outer ends of these levers 16 are connected by links 18 to a crosshead 19 that is mounted to slide on a rocker arm 20 secured to a shaft 21 mounted to oscillate in bearings 22 on the sides of the casing 9. The rocker arm 20 is graduated to indicate the positions of the crosshead 19 and the said crosshead is arranged to be adjusted longitudinally of said arms by means of a screw rod 23 swiveled to a depending lug on the said rocker arm. The rocker arm 20 is given a constant vibratory movement through a link 24 and a crank arm 25, which latter is secured to a counter shaft 26 journaled in the bearing brackets 22. On one projecting end of the counter shaft 26 is a half clutch 27 with which is engageable a half clutch 28 of a sprocket 29 that is primarily free to rotate and slide on said shaft. A coiled spring 30 compressed between the half clutches 27 and 28 presses the sprocket 29 toward the left, in respect to Fig. 1, and tends to separate the said half clutches, thereby leaving the said sprocket free to rotate without driving the said countershaft. The said sprocket, in practice, is arranged to be constantly driven by a power-driven sprocket chain, not shown. Mounted to freely oscillate on the counter shaft 26 between the hub of a sprocket 29 and a hub 31 on the adjacent bearing bracket 22, is a cam lever 32. This lever 32 has a cam-acting hub that engages a cam surface on the fixed hub 31 and in one position, permits the spring 30 to disengage the half clutch 28 from the half clutch 27 and in another position, forces the said half clutches into engagement, so that the counter shaft 26 will be driven from the sprocket 29.

The lower edge of the concave shield or surface 14 terminates on a horizontal line, and inasmuch as the drum partitions 10ᵇ are spiral or oblique, it is obvious that under rotation of the drum, the material carried in the pockets thereof, will be dumped from said pockets progressively and in succession. This is especially so with the drum arranged to discharge during downward movements of the pockets from the top of the drum. Furthermore, the dumping of the material from the pockets will have an overlapping action, that is, the one will begin its dumping action before the next has completed its dumping action, so that there will be a continuous and even discharge or feeding of the material rather than an intermittent or pulsating feeding action. This evenness of feed is very important in machines or groups of machines arranged to feed and blend various different materials in definite proportions.

Figure 1:
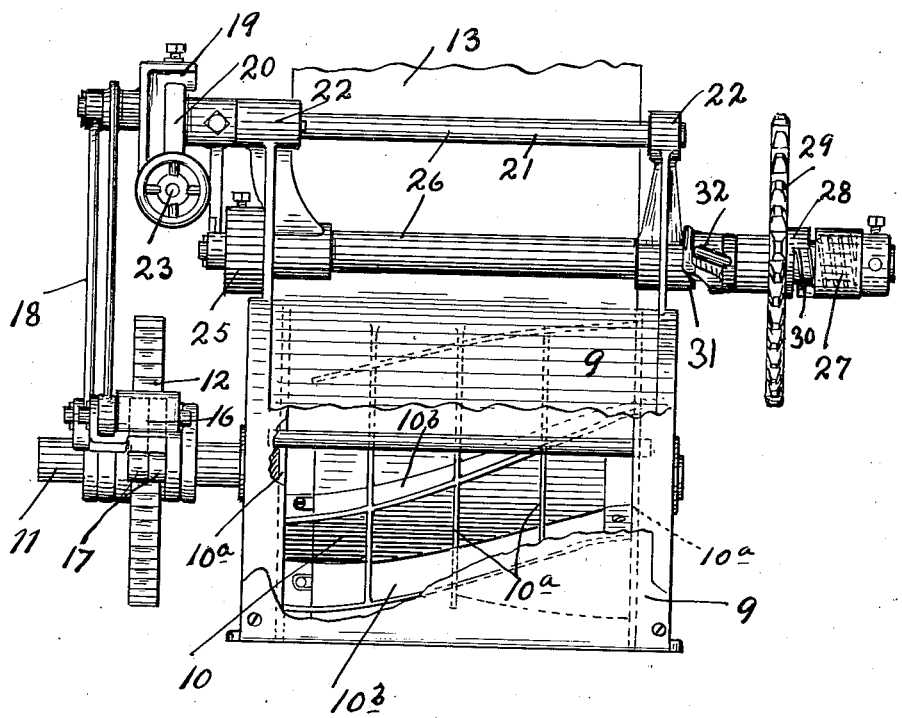
Figure 1 is a front elevation of the improved feeder, some parts being broken away.

Fig. 4 shows a feed drum that is like that illustrated in Figs. 1, 2 and 3, except that the sub-partitions 10ᶜ are omitted. The so-called shield 14 is advisably made as a part independent of the casing 9 so that it is capable of being inserted after the casing has been constructed, simply by applying the rods 15 to the sides of the casing. Such an arrangement is not only cheap construction, but has a decided advantage for the reason that for some classes of work the said shield will not be required, and hence, need not be applied. By making said rods 15 removable, this shield may, at any time, be removed when such action is desired. The term "drum", as applied to the feed drum, is used in a sense to include any kind of a rotary member performing the action of a feed drum.

What I claim is:

A feed device of the kind described comprising a casing having inlet and discharge passages, and a drum rotatively mounted in said casing, said drum having thin outstanding laterally spaced and longitudinally oblique pocket forming flanges and laterally spaced circumferential partitions, and the said casing having a surface that follows the periphery of said drum and terminates in a delivery edge that lies approximately in a plane radiating from the axis of the drum.

In testimony whereof I affix my signature in presence of two witnesses.

EMIL R. DRAVER.

Witnesses:
C. G. LANCASTER,
ESTHER MORGAN.